Jan. 7, 1936.  C. W. CRUMRINE  2,027,333
CAMERA CONSTRUCTION
Filed April 30, 1935

INVENTOR.
Chester W. Crumrine
BY
ATTORNEYS

Patented Jan. 7, 1936

2,027,333

UNITED STATES PATENT OFFICE 2,027,333

CAMERA CONSTRUCTION

Chester W. Crumrine, Rochester, N. Y., assignor to Eastman Kodak Company, Rochester, N. Y., a corporation of New York Application April 30, 1935, Serial No. 19,013

9 Claims. (Cl. 95—45)

This invention relates to photography and more particularly to photographic cameras. One object of my invention is to provide a photographic camera with an exposure frame for locating a film accurately in the focal plane of an objective, the exposure frame being adjustable independently of the camera in which it is mounted. Another object of my invention is to provide a camera with an exposure frame which can be adjusted with respect to the camera objective after the latter is mounted on a camera. Another object of my invention is to provide an exposure frame which provides a smooth runway for the film and which may be rocked upon its mount to care for variations occurring in the construction of the camera body. Still another object of my invention is to provide a means for rapidly and accurately truing up a camera exposure frame as for a manufacturing adjustment, and other objects will appear from the following specification, the novel features being particularly pointed out in the claims in the end thereof.

In cameras, and more particularly in cameras which are of a moldable composition, such as bakelite, cellulose acetate, or various other moldable materials, it is difficult, if not impossible, with some pieces to prevent the camera parts from warping or becoming distorted during the molding or cooling operations. It is consequently difficult to produce in a molded camera an exposure frame in which the frame is retained accurately flat in a plane and in which the film may be positioned with sufficient accuracy to produce the best results from high-grade wide aperture objectives.

Some of the expensive "miniature" type of cameras employ objectives of extreme speed, as, for instance, g. 1.9. Such objectives have to be adjusted with unusual accuracy with regard to the plane of the film for best results, and the film should be exactly at right angles to the axis of the objective. In cameras it is also difficult to mount a camera objective on a lens board which holds the objective accurately with its axis at right angles to the frame designed to hold a film in the focal plane of the objective. In other words, it is necessary, for best results, for the camera objective to be accurately aligned with the exposure frame of a camera.

It is to overcome these objections and to accurately position film with respect to an objective in a camera that I have designed the camera mechanism which will now be more fully described.

Coming now to the drawing wherein like reference characters denote like parts throughout:

Figure 1:
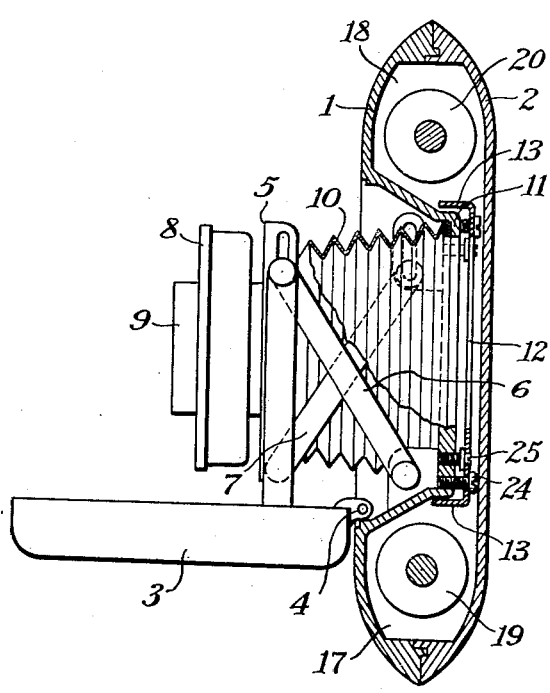
Fig. 1 is a side elevation partially in section of a camera constructed in accordance with and embodying a preferred form of my invention.
Figure 2:
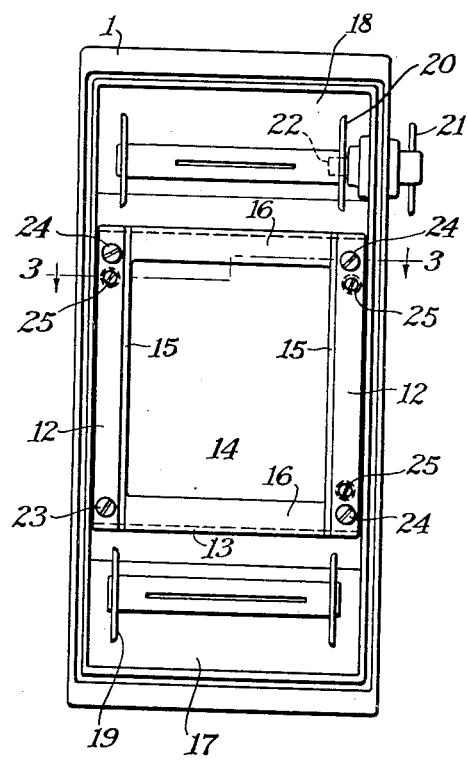
Fig. 2 is a plane view of the rear of the camera shown in Fig. 1 but with the camera back removed.

In the embodiment of my invention illustrated in the drawing I show a type of camera which may consist of a camera body 1 having removable back 2 and a bed 3 hinged at 4 to the camera body. Lens board 5, carried by a pair of lazy tongs 6 and 7, may support a shutter 8 carrying an objective in the usual type of lens cells which screw into the front and back of the shutter. Only one of these, 9, is shown in the drawing. A collapsible bellows 10 connects the lens board 5 and the frame 11 which is part of the camera body 1. I have thus far described a camera of known type.

However, the frame 11 on camera part 1 does not, as is customary, provide in itself a frame for locating the film. The camera is provided with a separate exposure frame 12 which is adjustably mounted on the camera body part 11, so that it may accurately support a film in the focal plane of the objective.

The frame 12 may be a metallic member having downwardly turned flanges 13 at one end and having an opening 14 through which an exposure may be made. I have preferred to provide a pair of guide rails 15 adapted to engage the edges of a film, these rails being slightly raised above the ends 16 of the frame to prevent scratching the exposure area as a film is wound from the supply spool chamber 17 to the takeup spool chamber 18.

In the drawing I have illustrated a supply spool 19 in chamber 17 and a takeup spool 20 in chamber 18 and, since any known type of spool supporting structure may be used, these have been omitted, except to show that a winding key 21 is provided with a web 22 for turning the takeup spool to wind film thereon.

The frame member 12, as above explained, may be made of rigid metal which will retain a plane surface satisfactorily. One end of this frame may be attached to the camera part 11 as by a screw 23. Two or more corners may be provided with pairs of holding screws 24 and locating screws 25 so that, by adjusting these members the angle and position of the exposure frame 12 may be changed after the camera has been completely assembled, and after an objective has been mounted thereon. This has a number of advantages; first, the frame may be adjusted as a fine focusing adjustment after the objective is in the camera; second, the frame being flat can be used for overcoming manufacturing variations in a molded camera part which can not always be held within a few thousandths of an inch of the desired dimensions. In case the objective has to be changed the frame can readily be adjusted for a second objective varying but slightly from the first, without altering the entire camera setup.

Figure 3:
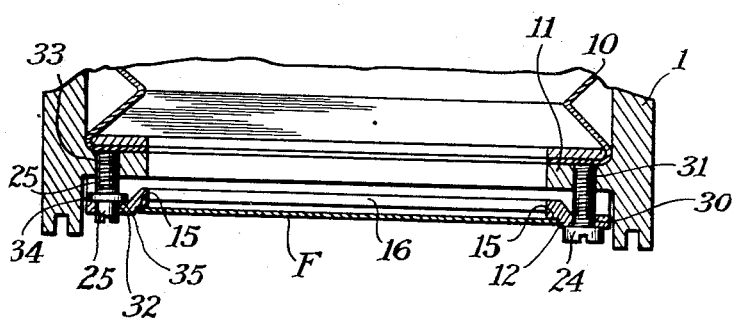
Fig. 3 is an enlarged sectional detail on line 3—3 of Fig. 2.

More specifically the adjustments are shown in Fig. 3 wherein the section passes through both a securing screw 24 on one side and a locating screw 25 on the other.

The securing screws pass through apertures 30 in the frame and into threaded apertures 31 in part 11 of the camera body. The locating screws 25 pass through apertures 32 in the frame and into threaded apertures 33 in camera part 11. The latter screws have flanges 34 adapted to contact with the under surface 35 of the frame 12 and by turning these screws the frame may be raised or lowered with respect to the camera part 11, or the frame may be altered to change its angular relation to the camera body 1.

The operation of adjusting an exposure frame 12 is extremely simple since the holding screws 24 are merely loosened and the adjusting screws 25 are adjusted until the frame is in the proper location. The holding screws 24 are then tightened and the frame 12 is properly positioned.

While I have described my invention as being particularly adapted for use on a small size camera which is made of either a thermo plastic or a thermo setting composition, such adjusting film locating frames are also quite suitable for other types of cameras, such as those which may be made of die castings, wood, or any other materials which are difficult to hold against warping or twisting out of shape. Such frames are also particularly useful in cameras of a type wherein no initial focusing provision is made for attaching the objective of a camera relative to an exposure frame, except the well known type of screw adjustment for the objective. It is often desirable to roughly focus an objective and later make a fine focusing adjustment on a focusing machine, or by trial and error with a target. In both of these types of focusing it is particularly convenient to provide a frame for locating the film which can be adjusted as above described. It should be noted that all of the screws used in adjusting the frame 12 with respect to the camera body 1 are available for adjustment with a film F located in position on the rails 15, as shown in Fig. 3. Thus, it is possible to adjust the frame 12 with a film in place or with a focusing screen of the same width as the film located on the rails 15.

While numerous changes can readily be made from the above described preferred embodiment of my invention I consider as within the scope of my invention, all such forms as may come within the terms of the appended claims.

What I claim is:

1. In a film camera, the combination with a camera body, including an opening through which an exposure may be made, of a lens board adapted to carry a camera objective, an exposure frame carried by the camera surrounding the exposure opening therein, said exposure frame comprising rigid and accurately formed plane surfaces adapted to position a film in the focal plane of the objective, and means for altering the position of the frame as a unit with respect to the camera.

2. In a film camera, the combination with a camera body, including an opening through which an exposure may be made, of a lens board adapted to carry a camera objective, an exposure frame carried by the camera surrounding the exposure opening therein, said exposure frame comprising rigid and accurately formed plane surfaces adapted to position a film in the focal plane of the objective, connections between the camera body and frame through which the plane of the film locating surfaces may be altered as a unit with respect to the camera.

3. In a film camera, the combination with a camera body, including an opening through which an exposure may be made, of a lens board adapted to carry a camera objective, an exposure frame carried by the camera surrounding the exposure opening therein, said exposure frame comprising rigid and accurately formed plane surfaces adapted to position a film in the focal plane of the objective, and a plurality of adjustable members connecting the frame to the camera for altering the position of the frame as a unit relative to the camera and to properly position the film guiding elements in the focal plane of the objective.

4. In a film camera, the combination with a camera body, including an opening through which an exposure may be made, of a lens board adapted to carry a camera objective, an exposure frame carried by the camera surrounding the exposure opening therein, said exposure frame comprising rigid and accurately formed plane surfaces adapted to position a film in the focal plane of the objective, and connecting and spacing members between the frame and camera by which the relation of the frame as a unit to the camera body may be controlled.

5. In a film camera, the combination with a camera body, including an opening through which an exposure may be made, of a lens board adapted to carry a camera objective, an exposure frame carried by the camera surrounding the exposure opening therein, said exposure frame comprising rigid and accurately formed plane surfaces adapted to position a film in the focal plane of the objective, and a plurality of movable spacing members for defining the position of the frame as a unit relatively to the camera.

6. In a film camera, the combination with a camera body, including an opening through which an exposure may be made, of a lens board adapted to carry a camera objective, an exposure frame carried by the camera surrounding the exposure opening therein, said exposure frame comprising accurately formed surfaces adapted to position a film in the focal plane of the objective, and a plurality of movable spacing members for defining the position of the frame relatively to the camera, and means for holding the frame on the spacing members in a set position said means being separate from the spacing members.

7. In a film camera, the combination with a camera body, of means for holding a camera objective, an exposure frame spaced from the objective, said frame comprising a surface for guiding film accurately in at least two sides of an aperture through which exposures are made, and a mounting carrying the frame on the camera including a fixed support for the frame at one corner, and a plurality of adjustable supports at the other three corners of the frame whereby the plane of the film locating surfaces for guiding film may be controlled and the frame may be trued up with respect to the focal plane of the camera objective without moving the objective with respect to the camera body.

8. In a film camera, the combination with a camera body, including spool chambers and an opening therebetween through which an exposure may be made, of a lens board adapted to carry an objective, an exposure frame comprising a plate including rigid film guiding rails adjustably mounted over the opening through which an exposure may be made and a downwardly extending flange extending entirely across the end of the exposure frame adjacent a spool chamber and extending downwardly into said spool chamber to form a light guard therewith.

9. In a film camera, the combination with a camera body, including spool chambers and an opening therebetween through which an exposure may be made, of a lens board adapted to carry an objective, an exposure frame comprising a plate including rigid film guiding rails adjustably mounted over the opening through which an exposure may be made and flanges on the ends of the exposure frame extending into the spool chambers to form a light-tight connection therewith.

CHESTER W. CRUMRINE.